United States Patent
Ehrlich

[15] 3,692,349
[45] Sept. 19, 1972

[54] TRAILER CONSTRUCTION
[72] Inventor: Donald J. Ehrlich, Monon, Ind.
[73] Assignee: Monon Trailer Inc., Monon, Ind.
[22] Filed: Sept. 23, 1970
[21] Appl. No.: 74,713

[52] U.S. Cl. ................................296/28 M, 52/497
[51] Int. Cl. ....................B62d 27/00, B62d 25/02
[58] Field of Search ......296/28 M, 28 D, 36, 32, 10, 296/11, 52; 52/300, 241, 497, 481; 105/409

[56] References Cited

UNITED STATES PATENTS

| | | |
|---|---|---|
| 3,266,837 | 8/1966 | Stricker et al. ..............296/36 |
| 607,490 | 7/1898 | Springer...............296/52 U X |
| 2,242,269 | 5/1941 | Siebler..................296/31 P X |
| 472,158 | 4/1892 | Burton........................105/409 |
| 2,888,297 | 5/1959 | Ridgway..................296/28 M |
| 3,353,863 | 11/1967 | Koot .......................296/28 M |

FOREIGN PATENTS OR APPLICATIONS 12,713   3/1916   Great Britain.............105/409

*Primary Examiner*—Kenneth H. Betts
*Assistant Examiner*—John A. Pekar
*Attorney*—Olson, Trexler, Wolters & Bushnell

[57] ABSTRACT

A trailer body is disclosed herein and generally includes a pair of side panels, an end panel, a top panel joining the side and end panels, and a floor positioned above and supported by a plurality of beams extending transversely of the side panels. Each of the side panels are secured to common ends of the support beams by an elongated channeled rail and fastening bolts extending transversely through the rail and side panel where they are fixed to the support beams, the bolts being positioned below the trailer body's floor so as not to interfere with cargo placed therein.

14 Claims, 6 Drawing Figures

PATENTED SEP 19 1972
3,692,349
SHEET 1 OF 2
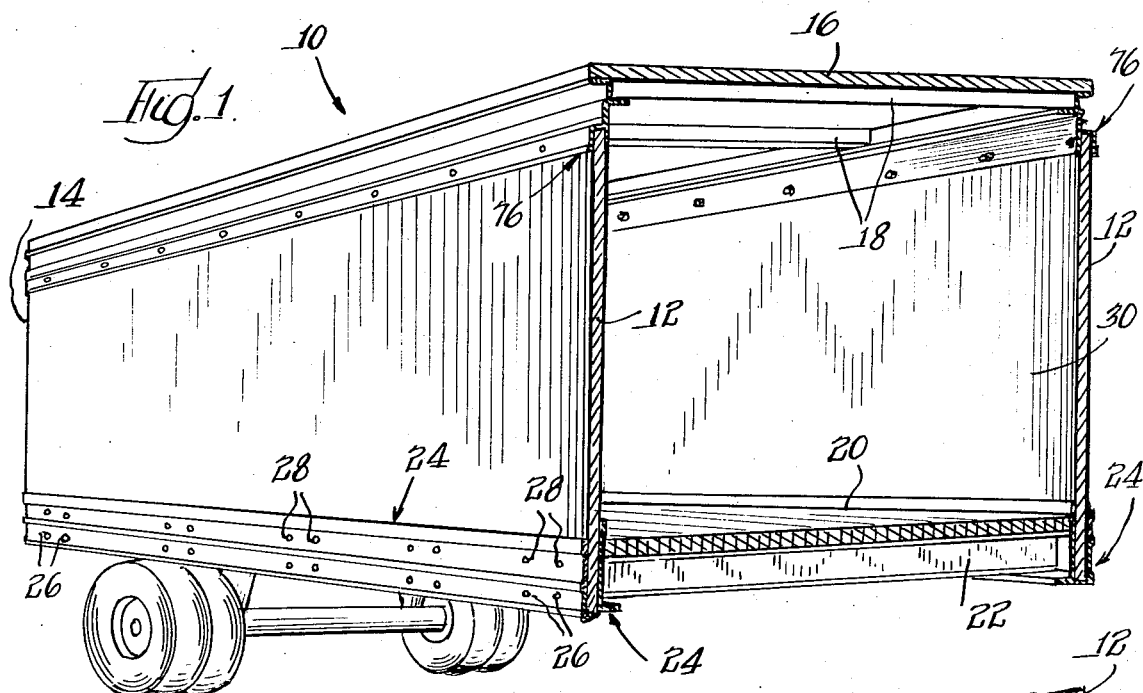
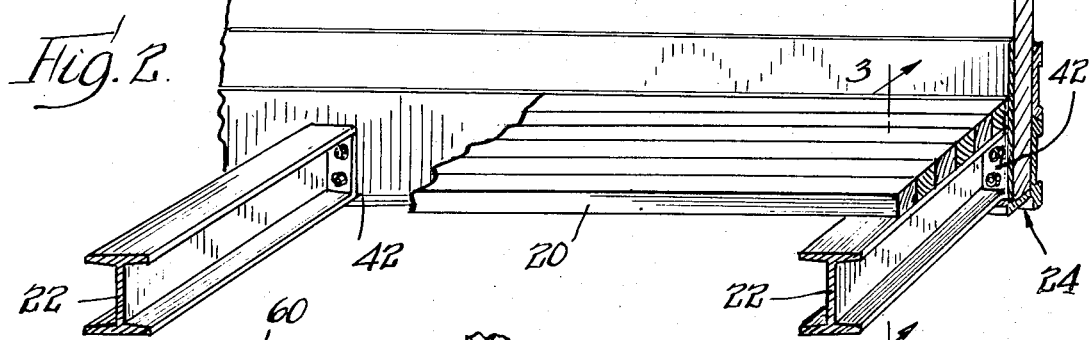
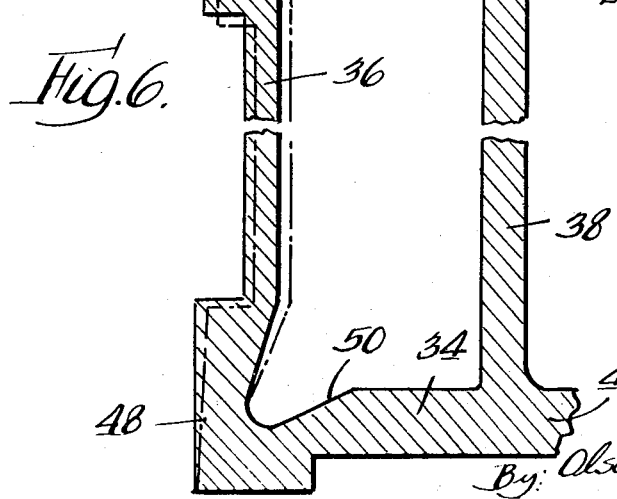
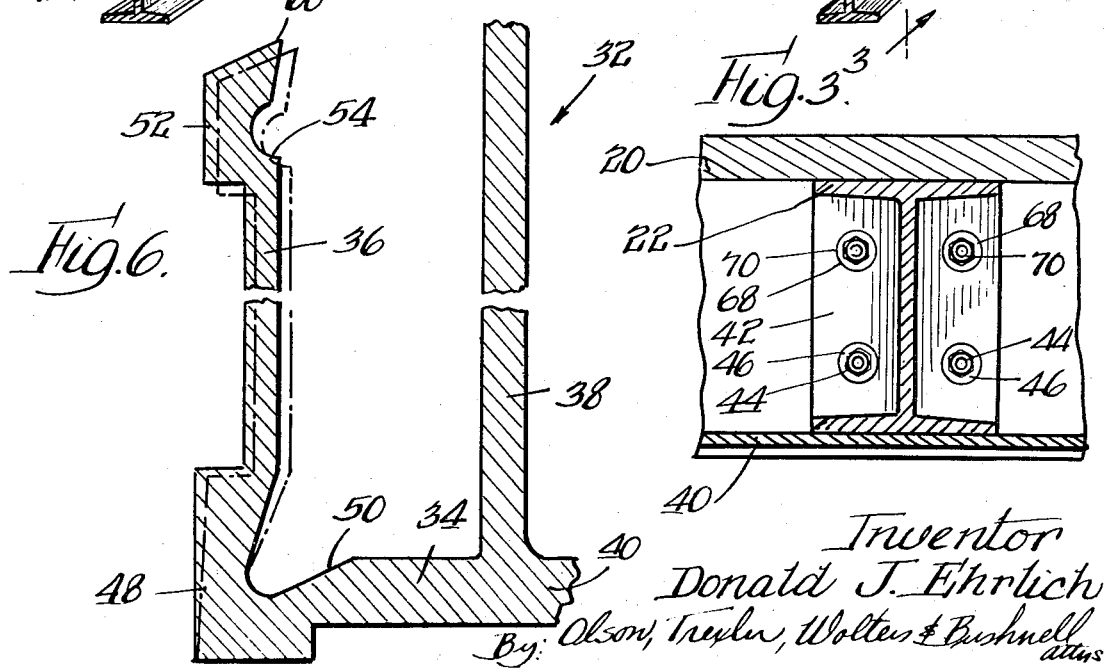
Inventor
Donald J. Ehrlich
By: Olson, Trexler, Wolters & Bushnell
attys

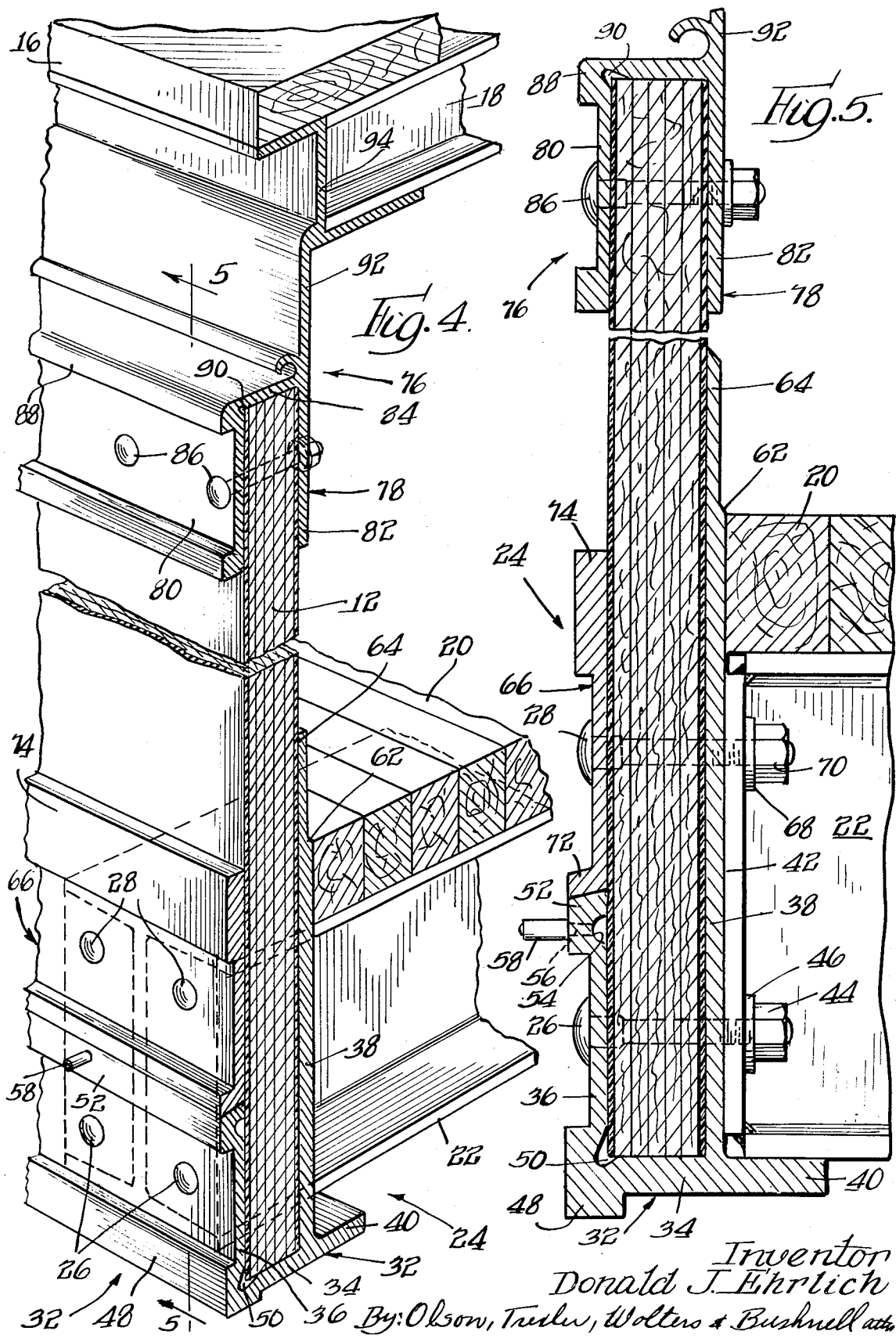

TRAILER CONSTRUCTION

SUMMARY OF THE INVENTION

This invention relates generally to a trailer construction and more particularly to assemblies for securing the side panels of a trailer body to the flooring thereof.

DISTINCTIONS OVER THE PRIOR ART AND OBJECTS

Today, many trailers and other such cargo transporting vehicles use rectangular and elongated panels to form the sides thereof. These panels are generally secured to the remainder of the trailer's body by fairly large bolts or other such fastening means which extend within the trailer body above the flooring thereof and which may interfere with the introduction and removal of cargo. Since much of the cargo is exposed or uncrated furniture, there is great likelihood that these inwardly extending bolts will nick, scratch or otherwise damage the furniture. In addition, it has been found that the prior art methods of securing such side panels to the remainder of the trailer body frequently do not meet desired standard for strength and rigidity.

Accordingly a general object of the present invention is to provide a new and improved assembly for securing a side panel of a trailer body to the flooring thereof, which assembly will not interfere with or damage cargo placed in the trailer, and which reliably secures the side panel to the trailer's flooring.

A more particular object of the present invention is to provide an assembly of the above stated type which eliminates the utilization of fastening means extending within the trailer body and thereby eliminates interference with or damage to the cargo which is otherwise caused by such obstructions.

Another object of the present invention is to provide an assembly of the above stated type which provides large surface contact between the assembly and the trailer's side panel for more reliably securing the assembled thereto.

Still another object of the present invention is to provide an assembly of the above stated type which utilizes a great number of fastening bolts all of which are positioned below the trailer's flooring.

Another object is to provide a novel connection between a side panel and side rail or frame member which is constructed for more effectively sealing an edge of the panel against exposure to moisture.

A further object of the invention is to provide a novel construction of the above described type utilizing a side panel having fiberglass coating extensions, which structure is such as to permit partial disassembly for easy replacement of the fiberglass in the event of damage.

These and other objects and features of the present invention will become more apparent from a reading of the following descriptions.

BRIEF DESCRIPTION OF THE DRAWINGS

In the drawings:

FIG. 1 is a perspective view of a trailer body which utilizes a pair of connecting assemblies constructed in accordance with the present invention;

FIG. 2 is an enlarged partially broken away perspective view of the flooring provided with the trailer body of FIG. 1;

FIG. 3 is an enlarged vertical sectional view taken generally along line 3—3 in FIG. 2;

FIG. 4 is an enlarged partially broken away perspective view showing one of the connector assemblies securing a side panel of the trailer body to the flooring thereof;

FIG. 5 is an enlarged vertical sectional view taken generally along line 5—5 in FIG. 4; and FIG. 6 is an enlarged partially broken away side view of a portion of one of the connector assemblies construction in accordance with the present invention.

DETAILED DESCRIPTION

Turning now to the drawings wherein like components are designated by like reference numerals throughout the various figures, a trailer body, constructed in accordance with the present invention, is illustrated in FIG. 1 and generally designated by the reference numeral 10. The trailer body includes a pair of rectangular side panels 12 which are preferably constructed of laminated plywood coated on opposite sides with fiberglass and glass, an end panel 14, a top panel 16 supported on a plurality of transversely extending and spaced apart I-beams or like beams 18, and a floor 20 supported on a plurality of transversely extending and laterally spaced I-beams or similar beams 22.

In accordance with the present invention, a connecting assembly 24 is provided with and extends the entire length of the lower end of each side panel 12 for supporting the side panel and fastening the same to common ends of beams 22. As will be seen in more detail hereinafter, each of the connecting assemblies includes a lower plurality of longitudinally spaced bolts 26 and an upper plurality of longitudinally spaced bolts 28, all of which extend transversely through an associated side panel 12 and below the floor 20. In this manner, the connecting assemblies 24 eliminate the utilization of fastening bolts extending within the cargo carrying housing 30 of the trailer body and thereby eliminate damage to the cargo, which damage is otherwise caused by such obstructions.

Turning to FIGS. 4 and 5, a connecting assembly 24 is shown in detail and includes an elongated integrally constructed channeled rail 32 which has a substantially U-shaped cross-section and which extends the length of side panel 12. The channeled rail includes a horizontal base or bight portion 34 for receiving and supporting the downwardly facing longitudinal edge of side member 12 and a pair of laterally spaced side walls 36 and 38 which are formed with and extend upwardly from opposite longitudinal edges of base 34 for engaging opposite sides of the side panel. In this regard, it is to be noted that a major portion of the channeled rail extends below floor 20 for securing the rail and therefore side panel 12 to common ends of I-beams 22.

The I-beams 22 are supported at opposite ends on outwardly extending flanged support members 40 which are formed with and extend the length of respective inner side walls 38 at the bottom thereof. A rectangular plate 42 (FIGS. 2, 3 and 5) is welded or otherwise suitably mounted to each end of each I-beam 22 and is positioned in confronting engagement with the otherwise exposed surface of inner side wall 38 when the I-beam is supported on flange members 40.

As illustrated in FIGS. 3 and 5, each of the plates 42 includes a pair (or any reasonable number) of spaced-apart apertures which cooperate with aligned apertures extending through the side walls 36, 38, and side panel 12 for receiving the body portions of bolts 26. In this manner, the bolts 26 along with respective cooperating nuts 44 and washers 46 not only secure one end of beam 22 to channeled rail 32, as illustrated in FIG. 5, but also providing squeezing type action to the side walls 36 and 38 of the channeled rail, so that the latter may more rigidly and securely support side panel 12. In this regard, an elongated joint 48 having a substantially rectangular cross-section is provided for joining the outer side wall 36 of channeled rail 32 to base or bight portion 34 and includes an angled substantially U-shaped groove or channel 50 extending into the joint at the inward joining corner of the side wall and bight portion, as illustrated best in FIG. 6.

This groove or channel provides a certain degree of foldability or flexibility to joint 48 so that the entire side wall 36 is moved in a substantially uniform lateral manner against the side panel 12 when the bolts 26 are tightened. In other words, the side wall 36 is maintained substantially vertical and parallel to the side panel 12 when it is squeezed inwardly from its solid line position to its dotted line position, as illustrated in FIG. 6. In this manner, the entire panel engaging surface of the side wall is maintained in substantially complete contact with the side panel regardless of required manufacturing tolerances and therefore more reliably holds the panel within the channeled rail. In the same light, it should be noted that the inner side wall 38 extends a substantial distance above and below floor 20 so as to present an even greater engaging surface to the opposite side of the panel 12, and thereby further adds to the securement thereof.

In order to prevent rain water or other such environmental entities from entering within the channeled rail 32 and de-laminate or otherwise damage side panel 12, a substantially rectangular and elongated outwardly extending flange or shoulder 52 is formed with the top of side wall 36 and extends the length thereof. The panel engaging surface of this flange or shoulder includes a longitudinal channel or groove 54 which is adapted to receive a sealant such as grease which may be inserted therein through a transverse opening 56 provided through shoulder 52 and communicating with channel or groove 54. A grease gun or other suitable means 58 may be provided for this purpose. In this regard, it should be noted that the top and adjoining right-hand surfaces of flange 52, as viewed in FIG. 6, meet at an angle slightly less than 90°, so as to define a toothed edge 60 which bites in and aggressively engages the outer surface of an associated panel 12 when the bolts 26 are tightened and thereby aids the sealant in preventing the environmental entities from entering within the channeled rail 32.

Returning the FIG. 5, it is to be noted that inner side wall 38 of channeled rail 32 extends upwardly beyond the level of floor 20 where it defines an inwardly and upwardly inclined horizontal shoulder 62 which aids in preventing dust or the like from entering between the floor 20 and side wall 38. Shoulder 62 merges with a substantially thinner upwardly extending side wall portion 64 which presents additional engaging surface area to the side panel 12 for further aiding in the support thereof.

Each of the connecting assembly 24 further includes an elongated substantially rectangular plate member 66 in the form of a side or rub rail which is mounted to the external surface of an associated side panel 12 adjacent to and above side wall 36 and which horizontally extends the length of the side wall. A plurality of longitudinally spaced apertures are provided transversely through plate member or rub rail 66 and respectively cooperate with aligned apertures provided through the side panel 12, side wall 38 of channeled rail 32 and engaging rectangular plate 42 for receiving the body portions of bolts 28 which, along with cooperating washers 68 and nuts 70, aid in fastening the rub rail, side panel, side wall and rectangular plate together. In this manner, the bolts 28, which as illustrated in FIG. 5 extend below floor 20 so as not to interfere with cargo placed thereon, provide an additional row of fastening means for further securing the side panel 12 within channeled rail 32, as well as to secure common ends of beams 22 to the side panel.

The lower end of plate member 66 includes a protruding shoulder portion 72 having a bottom surface which is formed to cooperatively engage the slightly inclined top surface of flange or shoulder 52 for further aiding in sealing the channeled rail 32. In addition, the top longitudinal edge of plate member 66 is formed with a substantially thicker outwardly extending rectangular flange or shoulder portion 74 which, because of its projecting manner, receives most of the scuffs, scratches or other similar types of damage which is so often received by the side of a vehicle. Therefore, damage directly to the side panel 12 is substantially eliminated. In the event that rub rail 66 becomes damaged to the degree that it detracts from the looks of the trailer body 10, it may be easily removed and replaced with a new rub rail without the necessity of disassembling the entire connecting assembly. In addition, if the side panel 12 requires patching, the rub rail may be removed for making the panel more accessible.

Briefly returning to FIG. 1, trailer body 10 is shown to include a pair of upper connecting assemblies 76 which are provided for supporting the top longitudinal ends of side panels 12 as well as the I-beams 18 and top panel 16. As seen in FIG. 4, connecting assembly 76 includes an elongated channeled rail 78 having an inverted U-shaped cross-section which is defined by a pair of downwardly extending side walls 80 and 82 joined at their top longitudinal edges by a base or bight portion 84. The top longitudinal end of panel 12 is positioned within the channeled rail 78 and is held thereat by a plurality of bolts or other similar fastening means 86 which extend through cooperating apertures in the side walls 78, 80, and side panel 12.

Like channeled rail 32, channeled rail 78 includes a flexible joint 88 which joins the side wall 80 and base or bight portion 84, and which includes a longitudinal channel or groove 90 formed at the inner corner therein so as to allow the side wall 80 to fully engage the side panel 12 when bolts 86 are tightened.

Assembly 76 further includes an inwardly extending right-angled flange 92 extending upwardly from and formed with the top longitudinal edge of side wall 82 for supporting common ends of transverse I-beams 18.

In addition, an outwardly extending right-angled flange 94 extending upwardly from and formed with the vertex of flange 92 is provided for aiding support beams 18 in supporting the top panel 16, all of which are suitably secured together.

While a particular embodiment of the invention has been shown, it should be understood, of course, that the invention is not limited thereto since many modifications may be made. It is, therefore, contemplated to cover by the present application any such modifications as fall within the true spirit and scope of the appended claims.

The invention is claimed as follows:

1. In a trailer body having a pair of side panels, and a floor positioned above and supported by a plurality of beams extending transversely of said side panels, the improvement comprising a pair of connecting assemblies for securing opposite ends of said beams to said side panels, each of said connecting assemblies including an elongated vertically extending channeled rail for receiving and supporting the lower margin of one of said side panels, said rail having spaced walls for supporting opposite sides of said side panel, and fastening means extending transversely through said side walls and associated side panel and connecting with common ends of said beams for securing said beams to said rail and therefore said side panel, said fastening means being below said floor whereby not to interfere with cargo placed on the floor of said trailer.

2. A trailer body according to claim 1 wherein each of said channeled rails includes an elongated horizontally extending base for supporting the lower edge of an associated side panel and said inner and outer laterally spaced side walls are formed with and extending upwardly from opposite longitudinal edges of said base for engaging opposite sides of said associated side panel.

3. A trailer body according to claim 2 which includes flexible joint means between one of said side walls and said base for permitting uniform lateral movement of said one side wall against an associated side panel whereby to provide substantially full contact with said side panel and thereby to more rigidly secure the latter within and to said rail.

4. In a trailer body having a pair of side panels, and a floor positioned above and supported by a plurality of beams extending transversely of said side panels, the improvement comprising a pair of connecting assemblies for securing opposite ends of said beams to said side panels, each of said connecting assemblies including an elongated vertically extending channeled rail for receiving and supporting the lower margin of one of said side panels, fastening means extending transversely through said rail and associated side panel and connecting with common ends of said beams for securing said beams to said rail and therefore said side panel, said fastening means extending below said floor whereby not to interfere with cargo placed on the floor of said trailer, each of said channeled rails including an elongated horizontally extending base for supporting the lower edge of an associated side panel and inner and outer laterally spaced side walls formed with and extending upwardly from opposite longitudinal edges of said base for engaging opposite sides of said associated side panel, said fastening means extending transversely through said side walls, and wherein at least one of said side walls of each of said channeled rails extends a substantial distance above and below said floor and presents a substantially large surface area for engaging said associated side panel whereby to more rigidly secure said side panel within and to said rail.

5. In a trailer body having a pair of side panels, and a floor positioned above and supported by a plurality of beams extending transversely of said side panels, the improvement comprising a pair of connecting assemblies for securing opposite ends of said beams to said side panels, each of said connecting assemblies including an elongated vertically extending channeled rail for receiving and supporting the lower margin of one of said side panels, fastening means extending transversely through said rail and associated side panel and connecting with common ends of said beams for securing said beams to said rail and therefore said side panel, said fastening means extending below said floor whereby not to interfere with cargo placed on the floor of said trailer, each of said channeled rails also including an elongated horizontally extending base for supporting the lower edge of an associated side panel and inner and outer laterally spaced side walls formed with and extending upwardly from opposite longitudinal edges of said base for engaging opposite sides of said associated side panel, said fastening means extending transversely through said side walls, and wherein a longitudinal groove is provided with and extends the length of the panel engaging surface of said outer side wall, said groove being adapted to receive a sealant for preventing water or other environmental entities from entering into said channeled rail.

6. In a trailer body having a pair of side panels, and a floor positioned above and supported by a plurality of beams extending transversely of said side panels, the improvement comprising a pair of connecting assemblies for securing opposite ends of said beams to said side panels, each of said connecting assemblies including an elongated vertically extending channeled rail for receiving an supporting the lower margin of one of said side panels, fastening means extending transversely through said rail and associated side panel and connecting with common ends of said beams for securing said beams to said rail and therefore said side panel, said fastening means extending below said floor whereby not to interfere with cargo placed on the floor of said trailer, each of said channeled rails also including an elongated horizontally extending base for supporting the lower edge of an associated side panel and inner and outer laterally spaced side walls formed with and extending upwardly from opposite longitudinal edges of said base for engaging opposite sides of said associated side panel, said fastening means extending transversely through said side walls, and wherein said inner side wall extends upwardly beyond said floor and includes a thinner upper portion joined to the remainder of the inner side wall by an inwardly and upwardly inclined shoulder, said shoulder being positioned above said floor.

7. In a trailer body having a pair of side panels, and a floor positioned above and supported by a plurality of beams extending transversely of said side panels, the improvement comprising a pair of connecting assemblies for securing opposite ends of said beams to said side panels, each of said connecting assemblies including an elongated vertically extending channeled rail for receiving and supporting the lower margin of one of said side panels, fastening means extending transversely through said rail and associated side panel and connecting with common ends of said beams for securing said beams to said rail and therefore said side panel, said fastening means extending below said floor whereby not to interfere with cargo placed on the floor of said trailer, each of said channeled rails also including an elongated horizontally extending base for supporting the lower edge of an associated side panel and inner and outer laterally spaced side walls formed with an extending upwardly from opposite longitudinal edges of said base for engaging opposite sides of said associated side panel, said fastening means extending transversely through said side walls, and wherein each of said connecting assemblies includes an elongated plate member mounted to the external surface of an associated side panel and adjacent the top of a corresponding outer side wall, and additional fastening means extending transversely through said plate member, said associated side panel and said inner side wall and connecting with common ends of said beams for securing said beams to said plate member said side panel and said channeled rail, said additional fastening means extending below said floor.

8. A trailer body according to claim 7 wherein each of said plate members extends the entire length of its associated channeled rail and includes an outwardly extending shoulder portion extending the entire length thereof.

9. A trailer body according to claim 7 wherein each of said first mentioned and second mentioned fastening means comprises a plurality of elongated bolts.

10. In a trailer body having a pair of side panels, and a floor positioned above and supported by a plurality of beams extending transversely of said side panels, a connector assembly comprising a channeled rail having an elongated horizontally extending base supporting the lower edge of one of said side panels and inner and outer laterally spaced side walls formed with and extending upwardly from opposite longitudinal edges of said base and engaging opposite sides of said side panel, and fastening means transversely insertable through said side walls and said side panel for securing said channeled rail and side panel to common ends of said beams, said fastening means extending below the floor of said trailer body whereby not to interfere with cargo placed on the floor of said trailer.

11. A structure according to claim 10 wherein one of said side walls is flexibly joined to said base for substantially uniform lateral movement against said side panel whereby to provide substantially full contact with said side panel.

12. A connecting assembly for use in a trailer body having a pair of side panels, and a floor positioned above and supported by a plurality of beams extending transversely of said side panels, said connector assembly comprising a channeled rail having an elongated horizontally extending base adapted to support the lower edge of one of said side panels and inner and outer laterally spaced side walls formed with and extending upwardly from opposite longitudinal edges of said base and adapted to engage opposite sides of said side panel, and fastening means transversely insertable through said side walls and said side panel for securing said channeled rail and side panel to common ends of said beams, said fastening means being adapted to extend below the floor of said trailer body whereby not to interfere with cargo placed on the floor of said trailer, one of said side walls being flexibly joined to said base for substantially uniform lateral movement against said side panel whereby to provide substantially full contact with said side panel, and wherein a longitudinal groove is provided with and extends the length of the panel engaging surface of said outer wall member and is adapted to receive a sealant for preventing water or other environmental entities from entering within said rail.

13. A connecting assembly according to claim 12 including an elongated plate member mountable to the external surface of said side panel and adjacent the top of said outer side wall, and additional fastening means transversely insertable through said plate member, said side panel and said inner side wall for further securing said side panel and said rail to the common ends of said beams, said plate member being positionable with respect to said floor so that said last mentioned fastening means extends below said floor.

14. A connecting assembly according to claim 13 wherein the inner side wall includes a thinner upper portion joined to the remainder of said inner side wall by an inwardly and upwardly inclined shoulder.

* * * * *